United States Patent
Han et al.

(10) Patent No.: US 9,309,160 B2
(45) Date of Patent: Apr. 12, 2016

(54) CERAMIC TILE PRODUCTS AND MANUFACTURING METHOD THEREOF

(71) Applicant: TAIMAX MATERIALS CO., LTD., New Taipei (TW)

(72) Inventors: Chia-Chih Han, New Taipei (TW); Huan-Chung Hsu, New Taipei (TW)

(73) Assignee: TAIMAX MATERIALS CO., LTD., New Taipei (TW)

( * ) Notice: Subject to any disclaimer, the term of this patent is extended or adjusted under 35 U.S.C. 154(b) by 0 days.

(21) Appl. No.: 14/460,754

(22) Filed: Aug. 15, 2014

(65) Prior Publication Data

US 2016/0009601 A1 Jan. 14, 2016

(30) Foreign Application Priority Data

Jul. 9, 2014 (CN) .......................... 2014 1 0325133

(51) Int. Cl.
 C04B 11/26 (2006.01)
 C04B 35/64 (2006.01)
 C04B 33/132 (2006.01)

(52) U.S. Cl.
 CPC ............... *C04B 35/64* (2013.01); *C04B 33/132* (2013.01)

(58) Field of Classification Search
 CPC .... C04B 11/26; C04B 11/262; C04B 11/264; C04B 11/266; C04B 14/365
 See application file for complete search history.

(56) References Cited

U.S. PATENT DOCUMENTS

| | | | | |
|---|---|---|---|---|
| 4,580,790 | A * | 4/1986 | Doose | 524/546 |
| 5,558,690 | A * | 9/1996 | Hnat et al. | 65/134.8 |
| 5,935,885 | A * | 8/1999 | Hnat et al. | 501/1 |
| 2003/0145534 | A1* | 8/2003 | Hojaji et al. | 52/167.1 |
| 2009/0173464 | A1* | 7/2009 | Baig | 162/164.1 |

* cited by examiner

*Primary Examiner* — Noah Wiese
(74) *Attorney, Agent, or Firm* — Li & Cai Intellectual Property (USA) Office

(57) ABSTRACT

A manufacturing method for ceramic tile products comprises the steps of providing a green body and sintering the green body. The green body has a composition comprising gypsum ranging from 15 to 35% weight of the green body and a subsidiary material ranging from 65 to 85% weight of the green body.

13 Claims, 2 Drawing Sheets

---

Providing a green body, and the green body having a composition comprising phosphogypsum ranging from 15 to 35 % weight of the green body and a subsidiary material ranging from 65 to 85 % weight of the green body — S100

Preheating and drying the green body at an operating temperature of less than 400°C and keeping 60 to 120 minutes — S101

Sintering the green body at an operating temperature ranging from 1130 to 1200°C and keeping on 90 minutes — S102

CERAMIC TILE PRODUCTS AND MANUFACTURING METHOD THEREOF

BACKGROUND OF THE INVENTION

1. Field of the Invention

The instant disclosure relates to a ceramic tile product and the manufacturing method thereof; in particular, to a ceramic tile product and a manufacturing method that utilizes solid waste and phosphogypsum generated from industrial emissions of the Phosphoric Acid production process or Desulfurization process as a raw material.

2. Description of Related Art

Ceramic tiles are generally molded into porcelain, stone, or pottery that are acid resistant, for constructive or decorative ceramic tile products via mill grinding, mixing, spraying, pressing, glazing, and sintering. Aesthetically pleasing yet durable, the ceramic tiles are typically applied on floors, walls, showers, swimming pool, sidewalk bricks. etc.

Natural minerals such as kaolin, pottery stone, feldspar, quartz, ball clay, and other auxiliary materials etc. are some of the typical raw materials for ceramic tiles after appropriate blending. However, with the limited amount of mine deposit locations, potential resources of the natural minerals, and similar limiting factors, a vast amount of resources have been consumed, and the natural environment, geology and geomorphology has been undermined, thus creating a major concern to environmental pollution and natural resource conservation during the process of mining and transportation. Specifically, extravagant mining of natural minerals for the manufacturing of ceramic tile materials is an irreversible and non-renewable process that consumes and depletes one of the earth's greatest natural assets, which encroaches on the interests of future generations to come.

Finding a replacement for the natural mineral resources as raw materials will help immensely in an effort to protect the environment and dramatically reduce the production cost of ceramic tile products. All around the world, many companies within the industry face the imminent problem of waste pileup and pollution. If wastes can be used as raw materials for ceramic tile products, not only will the production costs of the ceramic tiles products, but also the detrimental effects of the wastes on the environment, be significantly reduced.

To address the above issues, the inventor strives via associated experience and research to present the instant disclosure, which can effectively improve the limitation described above.

SUMMARY OF THE INVENTION

The objective of the instant disclosure is to provide a ceramic tile manufacturing method which utilizes solid waste and phosphogypsum generated from the production of phosphorous as a raw material to recycle resources as well as protect the environment.

Another objective of the instant disclosure is to provide a ceramic tile product which utilizes solid waste, phosphogypsum, generated from the production of phosphorous as a raw material to make efficient use of resources and further protect the environment.

In order to achieve the aforementioned objectives, according to an embodiment of the instant disclosure, a ceramic tile product manufacturing method is provided to include the steps of: providing a green body, in which the green body has a composition comprising phosphogypsum ranging from 15 to 35% weight of the green body and a subsidiary material ranging from 65 to 85% weight of the green body, and sintering the green body to obtain the ceramic tile product.

The instant disclosure provides a ceramic tile product according to the aforementioned method which includes a ceramic tile product. The ceramic tile product includes a tile body having a composition comprising phosphogypsum ranging from 15 to 35% weight of the tile body and a subsidiary material ranging from 65 to 85% weight of the tile body.

In summary, the ceramic tile products made from the manufacturing method in accordance with the instant disclosure mainly uses phosphogypsum, a solid waste that is generated during the production of phosphoric acid, to replace the conventional natural minerals having sinter boosting effects such as feldspar or pottery stone. Thus, the mining of natural minerals can be reduced, the material costs of the tiles can be effectively reduced, and the earth's resources and energy are effectively protected. Moreover, the use of phosphogypsum for the production of tiles not only effectively reduce solid waste pileup, but also further reduce the chances of air, water, and land pollution, as well as protecting the environment.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

Figure 1:
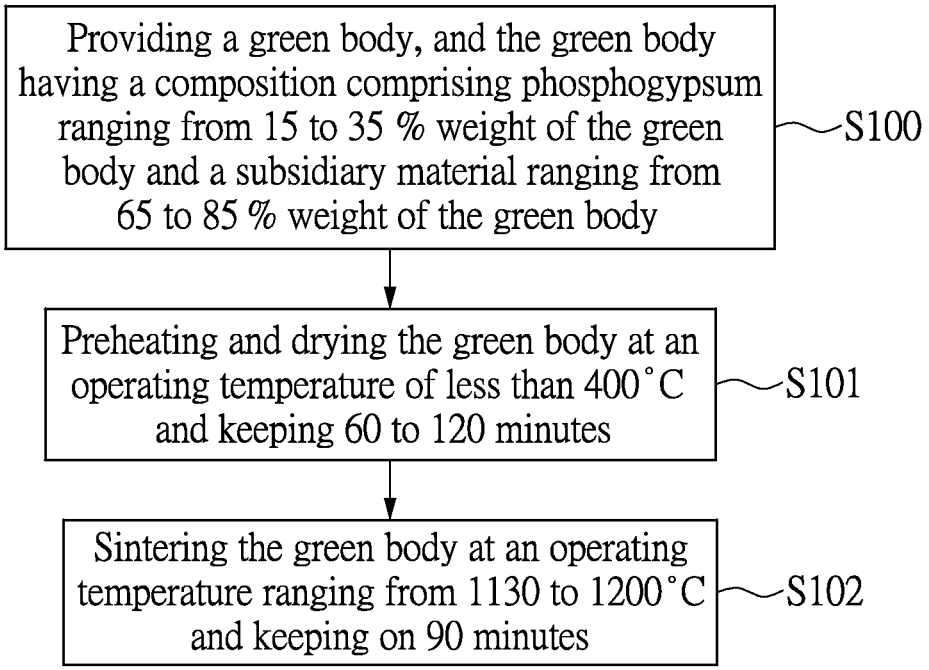
FIG. 1 is a schematic flow diagram illustrating a manufacturing method for ceramic tile products in accordance with an embodiment of the instant disclosure.

Please refer to FIG. 1 as the schematic flow diagram illustrating a manufacturing method for ceramic tile products in accordance with an embodiment of the instant disclosure. The manufacturing method for ceramic tile products of the instant embodiment includes the following steps.

As shown in step S100, providing a green body. The green body has a composition comprising phosphogypsum ranging from 15 to 35% weight of the green body and a subsidiary material ranging from 65 to 85% weight of the green body.

Specifically, the subsidiary material is an inorganic material including silica sand, white clay, and bottom ash from a coal-fired power plant. The subsidiary material is selected based on the required specifications and sintering parameters of the actual products. For example, the subsidiary material of the instant disclosure includes silica sand, white clay, and bottom ash from a coal-fired power plant, and are all applied together with phosphogypsum. However, in another embodiment, the subsidiary material can be solely one or two of the three materials (silica sand, white clay, and bottom ash from a coal-fired power plant) to be applied with phosphogypsum, and is not limited to the example provided herein.

Specifically, the silica sand has a particle size less than 4.75 mm. Fineness modulus ranging from 3.7 to 1.6 includes fine aggregates such as natural sand, machine-made sand, mixed sand. White clay or bentonite is mainly made of silica, alumina and water, as well as elements such as iron, magnesium, calcium, sodium, and potassium. Bentonite has a relatively high water absorption and high expansibility. Bentonite can absorb water up to 8 to 15 times its volume while expanding up to 30 times its volume. In aqueous media, bentonite is dispersed into gelatinous and suspended substance. This media solution has a certain viscosity and lubricity, relatively strong capacity for cation exchange, and certain absorbability for various gases, liquids, and organic substances. The maximum absorbability can reach up to 5 times its weight. Bentonite when mixed with water, mud or small sands provides plasticity and cohesiveness. Bottom ash from a coal-fired power plant is mainly made of silica, alumina, calcium oxide, and ferric oxide (iron III oxide).

As shown in step S101, preheating and drying the green body. Specifically, the pressed made green body is sent to a drying kiln for preheating and drying at an operating temperature of 350~400° C. and keeping on 60-120 minutes for a sintering performance completely. The preheating and drying is mainly to control the moisture content of the green body to be less than 1%. Specifically, water content in the green body is mechanically removed to prevent the green body from cracking due to expansion. In a downstream process, sintering, pressure buildup typically due to the steam generated by quick vaporization of water trapped in the green body, which leads to the expansion. In the instant embodiment, the use of a drying kiln for the preheating and drying of the green body is not intended to limit to the scope of the instant disclosure.

As shown in S102, sintering the green body. Specifically, in the manufacturing process, the preheated and dried green body is sent to a roller kiln for sintering. The sintering occurs at an operating temperature ranging at 1130 to 1200° C. and keeping on 30~45 minutes at high temperature for a sintering performance completely. The ceramic tile product is completed after the green body is sintered. The sintering process or step in the manufacturing method of the green body is not limited only to the use of the roller kiln provided in the instant embodiment.

Ceramic tile products made of phosphogypsum, the raw material, are provided after undergoing the process steps as mentioned above. Furthermore, phosphogypsum is used as the main raw material for the ceramic tile products mainly due to phosphogypsum's ability to serve as a sintering fluxing agent for the ceramic raw materials, in which the sintering process mainly requires calcium oxide from phosphogypsum to accelerate a preferred sintering in high temperature.

Specifically, phosphogypsum is a general industrial solid waste, category II, which is a solid waste discharged during the production of phosphate and phosphoric acid or from the industrial emissions of the desulfurization process. The main composition of Phosphogypsum includes calcium, magnesium, and phosphorus pentoxide. The effective content of calcium oxide is up to 36 to 38%, while the effective content of magnesium oxide is up to 8 to 9%, whereas the effective content of phosphorous pentoxide is up to 2 to 3% in Phosphogypsum. Since phosphogypsum is enriched in alkaline earth metals, highly preferred materials for fluxing, and a sum of calcium and magnesium with an effective content of nearly 45%, phosphogypsum far surpasses the typical fluxing agent, feldspar and pottery stone, in the ceramic tile industry in terms of raw materials. Thus, the phosphogypsum in the instant disclosure can replace the required typical natural minerals, feldspar or pottery stone, for ceramic tile manufacturing process while reducing the mining for natural minerals and effectively reducing the production cost of tile materials. Moreover, phosphogypsum also includes trace amounts of arsenic, copper, zinc, iron, manganese, lead, cadmium, mercury and other radioactive elements that are mostly insoluble solids. With the appropriate ratio included in the overall design, the trace amount of elements can be safely cured within the ceramic lattice via the sintering process while providing weathering and chemical resistance, as well as reducing any harm to a negligible level.

Figure 2:
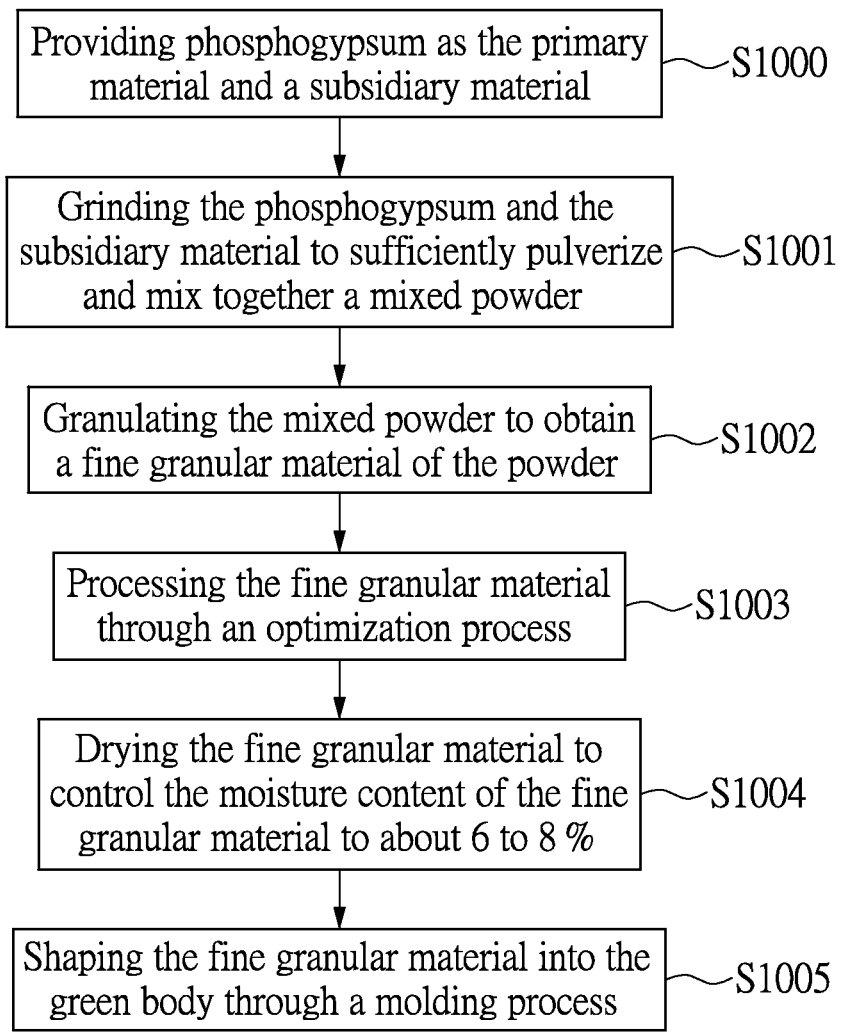
FIG. 2 is a schematic flow diagram of FIG. 1 illustrating the process of manufacturing a green body in accordance with an embodiment of the instant disclosure.

The following further discloses the details of the manufacturing method for a tile body. Please refer to FIG. 2 as the schematic flow diagram of FIG. 1 illustrating the process of manufacturing a tile body in accordance with an embodiment of the instant disclosure.

As shown in step S1000, providing phosphogypsum as the primary material and a subsidiary material phosphogypsum ranges from 15 to 35% weight of a tile body and a subsidiary material ranging from 65 to 85% weight of the tile body. Subsidiary material can be one of the following: silica sand, white clay, or bottom ash from a coal-fired power plant.

As shown in step S1001, grinding the phosphogypsum and the subsidiary material to sufficiently pulverize and mix together a mixed powder. Specifically, the required amount of main (phosphogypsum) and subsidiary materials is loaded into a feeder, then transported to a feeding belt conveyor through linked plates, and further conveyed to a vertical mill through the feeding belt conveyor. The materials are grinded with a 200 mesh to obtain a mixed powder having a grain size of 75 microns. Only the mixed powder satisfying the required grain size is collected through a pulse bag filter, and then transported by a screw conveyor to silos or hoppers for storage. The equipment provided such as feeder, feeding belt conveyor, and vertical mill are only embodiments of the instant disclosure, and it is not limited thereto.

Notably, the vertical mill that is applied in the manufacturing process in accordance with the instant disclosure refers to dry milling, which is different from the conventional wet ball mills applied in some manufacturing process for ceramic tile products. Besides more energy and water efficient manufacturing, more attention is also needed to be paid to industrial waste such as phosphogypsum and bottom ash from coal-fired power plants due to its effects on manufacturing efficiency since acidic substances increase the rheotaxis and rheology of the slurry, which may dissolve from these industrial wastes. If a wet ball mill is applied for the manufacturing of ceramic tile products, raw minerals are inserted into a horizontal ball mill. As the ball mill continuously rotates, solid milling or grinding medium, such as artificial highly oxidized aluminum balls or naturally high-silica content aluminum pebbles, continuously and frictionally rotates one against the other to provide pulverization. Conventional wet ball milling typically requires water input of 45 to 55% weight of the dry mineral weight in order to generate slurry that provide an effective grinding environment for the milling medium. However, since the moisture content of the raw material powder is about 6% to 10% for the subsequent molding process, there is water loss before the milling, as well as boosts in energy consumption and air pollution, which will take place after the wet ball milling process, the subsequent spray conveyor, and the successive high temperature rapid drying at about 650° C.

As shown in step S1002, granulating the mixed powder to obtain a fine granular material of the powder. The mixed powder is granulated such that the powder has a certain rigid mobility as well as compactness and homogeneity as the powder is being filled, which is appropriate for compression molding using a hydraulic molder. Specifically, the hopper has a belt scale at the bottom of the hopper for weighing and transporting the preferred amount of mixed powder to a pooled belt conveyor. A uniform layer of mixed powder is then formed on the pooled belt conveyor, and the mixed powder is conveyed to the hopper by a bucket elevator for spare use. The mixed powder is transported into a weighing hopper through a screw conveyor. When the mixed powder enters the weighing hopper and matches the preset weight, the screw conveyor ceases to further transport any additional mixed powder. A bottom portion of the weighing hopper has an output, which is an input to a granulator. A 12% mist is dispersed onto the mixed powder in the granulator to initiate mixing and to provide moisture for the granulating process. A fine granular material is obtained from the above process. In the instant step, equipment such as a bucket elevator and granulator is only used in one of the embodiments of the instant disclosure, and it is not limited to the examples provided herein.

As shown in step S1003, processing the fine granular material through an optimization process. Specifically, the processed fine granular materials are unloaded from the bottom of the granulator and are passed through sieves of an optimizer for filtering. The materials having relatively larger grain size will be sieved out, whereas the fine granular materials having the preferred grain size will be subsequently dried. In the instant step, the equipment such as the optimizer is only one embodiment of the instant disclosure and it is not limited thereto.

As shown in step S1004, drying the fine granular material to control the moisture content of the fine granular material to about 6 to 8%. Specifically, the fine granular materials having preferred grain size and the fine granular materials that were optimized are sent to a dry fluidized bed for drying, such that the water content of the fine granular materials is controlled to be about 6 to 8%. The dryer in the instant step is only one embodiment of the instant disclosure, and it is not limited thereto.

As shown in step S1005, shaping the fine granular material into the green body through a molding process. Specifically, portions of the fine granular materials stored in different hoppers are sampled throughout different periods of time and are sent to a hydraulic molder for briquetting and to obtain the green body as disclosed in FIG. 1. The molder in the instant step is only one embodiment of the instant disclosure and it is not limited thereto.

According to each step in the manufacturing method of the ceramic tile products, the ceramic tile products in the instant disclosure is mainly made of inorganic materials such as silica sand, white clay, and bottom ash from a coal-fired power plant, after sufficiently grinding, mixing, granulating, drying, compressing (molding), preheating, and sintering at an operating temperature ranging from 1130 to 1200° C. to achieve a deeply sintered condition. The pressure of the saturated steam that is generated by the preheating process and the initial heating and drying of the green body provides an environment for carbon and other organic materials to rapidly undergo oxidation reaction. Since the oxidation reaction here is an exothermic reaction, the peripheral inorganic materials such as silicon, aluminum, calcium, magnesium, etc., are stimulated to initiate a chain reaction, mineralization, on the outer surface of the green body. With the energy converted from heating at a constant temperature thereafter, a uniformly covalent bond crystal glass phase is formed on the outer surface of the green body, which is the deeply sintered condition. Reactants mainly include elements such as calcium, magnesium, silicon and aluminum, such that the inorganic materials have a certain mechanical strength and chemical stability.

The following further emphasizes the structural properties of the ceramic tile products in accordance with the instant disclosure. The ceramic tile products, or tiles have the following structural specification:

1. The tile body has a thickness ranging from 3 to 6 centimeters.
2. The tile body has a water absorption rate less than 1%.
3. The tile body is a porcelain tile.
4. The tile body has a resistance of abrasion in depth less than 345 mm$^3$.
5. The tile body has a modulus of rupture more than 1080N.

In summary, the ceramic tile products made from the manufacturing method in accordance with the instant disclosure mainly uses phosphogypsum, a solid waste that is generated during the production of phosphoric acid, to replace the conventional natural minerals such as feldspar or pottery stone. The mining of natural minerals are reduced, the material costs of the tiles are effectively reduced, and the earth's resources and energy are effectively protected. Moreover, the use of phosphogypsum for tile production not only effectively reduce solid waste pileup, but also further reduces the chance of air, water, and land pollution, as well as protecting the environment.

The figures and descriptions supra set forth illustrate the preferred embodiments of the instant disclosure; however, the characteristics of the instant disclosure are by no means restricted thereto. All changes, alterations, combinations or modifications conveniently considered by those skilled in the art are deemed to be encompassed within the scope of the instant disclosure delineated by the following claims.

What is claimed is:

1. A manufacturing method for ceramic tile products, comprising the steps of:
   providing a green body, the green body having a composition comprising phosphogypsum ranging from 15 to 35% weight of the green body and a subsidiary material ranging from 65 to 85% weight of the green body; and
   sintering the green body;
   wherein in the step of providing the green body comprising the steps of:
      providing the phosphogypsum and the subsidiary material;
      grinding the phosphogypsum and the subsidiary material to sufficiently pulverize and mix together a mixed powder through a dry grinding process without the addition of water;
      granulating the mixed powder to obtain a fine granular material;
      processing the fine granular material through an optimization process;
      drying the fine granular material to control the moisture content of the fine granular material to about 6 to 8%; and
      shaping the fine granular material into the green body through a molding process.

2. The manufacturing method for ceramic tile products as recited in claim 1, wherein prior to the step of sintering the green body further comprising:
   preheating and drying the green body to control the moisture content of the green body to less than 1%.

3. The manufacturing method for ceramic tile products as recited in claim 2, wherein the green body is preheated and dried at an operating temperature of less than 400° C.

4. The manufacturing method for ceramic tile products as recited in claim 1, wherein the subsidiary material is an inorganic material, and the inorganic material is construction natural silica sand, white clay, bottom ash from a coal-fired power plant, or a combination thereof.

5. The manufacturing method for ceramic tile products as recited in claim 1, wherein the green body is sintered at an operating temperature ranging from 1130 to 1200° C.

6. The manufacturing method for ceramic tile products as recited in claim 1, wherein the ceramic tile product obtained after the sintering step has a glass phase, and the glass phase includes a covalent crystal.

7. The manufacturing method for ceramic tile products as recited in claim 1, wherein the phosphogypsum includes calcium, magnesium, and phosphorus pentoxide.

8. A ceramic tile product, comprising:
a tile body including phosphogypsum ranging from 15 to 35% weight of the tile body and a subsidiary material ranging from 65 to 85% weight of the tile body;
wherein the subsidiary material is an inorganic material, and the inorganic material is construction natural silica sand, white clay, bottom ash from a coal-fired power plant, or a combination thereof.

9. The ceramic tile product as recited in claim 8, wherein the tile body has a thickness ranging from 3 to 6 centimeter.

10. The ceramic tile product as recited in claim 8, wherein the tile body has water absorption less than 1%.

11. The ceramic tile product as recited in claim 8, wherein the tile body is a ceramic or porcelain tile.

12. The ceramic tile product as recited in claim 8, wherein the tile body has resistance of abrasion in depth of less than 345 mm$^3$.

13. The ceramic tile product as recited in claim 8, wherein the tile body has a modulus of rupture more than 1080N.

\* \* \* \* \*